(12) United States Patent
Armabessaire

(10) Patent No.: US 7,951,222 B2
(45) Date of Patent: May 31, 2011

(54) METHOD FOR THE RECOVERY BY MELTING OF AT LEAST ONE NON-FERROUS METAL, AND PRODUCT FOR THE IMPLEMENTATION OF THE METHOD

(76) Inventor: Jean Armabessaire, Pontault-Combault (FR)

( * ) Notice: Subject to any disclaimer, the term of this patent is extended or adjusted under 35 U.S.C. 154(b) by 0 days.

(21) Appl. No.: 12/576,301

(22) Filed: Oct. 9, 2009

(65) Prior Publication Data

US 2010/0107819 A1    May 6, 2010

(30) Foreign Application Priority Data

Oct. 9, 2008    (EP) ..................................... 08305663

(51) Int. Cl.
*C22B 7/00* (2006.01)
*C22B 9/14* (2006.01)
(52) U.S. Cl. ................. 75/401; 75/402; 75/585; 75/709
(58) Field of Classification Search .................... 75/709, 75/585, 401, 402
See application file for complete search history.

(56) References Cited

U.S. PATENT DOCUMENTS 6,485,541 B1 * 11/2002 Hryn et al. ...................... 75/709
2004/0046293 A1 * 3/2004 Gross ............................. 266/221

FOREIGN PATENT DOCUMENTS

FR    2 672 620    8/1992

OTHER PUBLICATIONS

Derwent Acc-No. 1971-49824S for SU 280213 A. Application date May 5, 1969. Abstract.*

* cited by examiner

*Primary Examiner* — George Wyszomierski
*Assistant Examiner* — Tima M McGuthry-Banks
(74) *Attorney, Agent, or Firm* — Stites & Harbison PLLC; Stephen J. Weyer

(57) ABSTRACT

The invention relates in particular to a method for the recovery of at least one non-ferrous metal (11) contained in scrap (9), by melting the scrap (9) in a furnace (1), the method comprising:
 a step of charging the furnace (1) with scrap (9),
 a step of melting the scrap (9) in order to separate the at least one non-ferrous metal (11) from other components (13) which the scrap (9) comprises. The method is noteworthy in that it comprises a step of adding a silica-comprising product (15) in an amount which is sufficient to form an airtight layer on the surface of the scrap (9).

11 Claims, 1 Drawing Sheet

Figure 1:
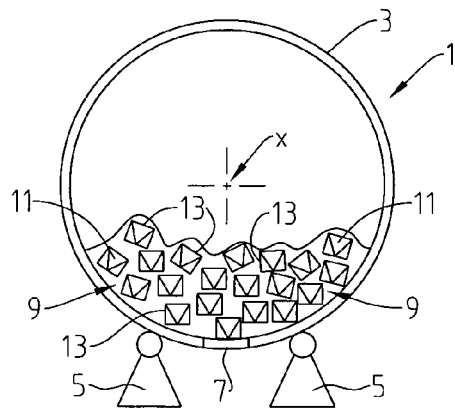

METHOD FOR THE RECOVERY BY MELTING OF AT LEAST ONE NON-FERROUS METAL, AND PRODUCT FOR THE IMPLEMENTATION OF THE METHOD

The present invention relates to a method for the recovery by melting of at least one non-ferrous metal, such as aluminium or its alloys, or zinc and its alloys, and to a product for the implementation of the method.

Methods exist for recovering the non-ferrous metals of industrial or so-called "recovery" residues.

Industrial residues mainly comprise profiles, tubes, sheetmetal, waste parts, dead heads and machining chips. Such residues are generally clean, and only slightly oxidized, or not oxidized at all.

This is not the case of recovery residues which are dirty and oxidized, or even greatly oxidized. Recovery residues originate in particular from castings, engine blocks and cylinder heads, gearboxes, domestic articles, such as drinks cans, preserve tins.

The recovery of the non-ferrous metals contained in such (industrial or recovery) residues is generally carried out in rotary furnaces having a fixed or tilting axis and operating without the entry of air into the vessel or permitting the entry of air.

In order to allow the recovery of non-ferrous metals in furnaces permitting the entry of air, it is known to melt the residues while adding rock-salt (also referred to as halite) to the vessel, allowing to confine the non-metallic materials when the rock-salt is in the liquid state. Optionally, a product called a "flux" is added to the rock-salt to facilitate the melting of the metal and to confine the non-metallic materials more easily.

In order to do that, it is necessary to add as much rock-salt as there are non-metallic materials contained in the furnace.

This results in a large consumption of salt in order to recover the non-ferrous metals from the recovery residues.

In addition, the slags resulting from the mixture of salt and metallic materials pollute the environment and are expensive to recycle.

Furnaces operating without the entry of air, such as those described in patent application FR 2 672 620, theoretically allow one to recover non-ferrous metals without adding rocksalt.

However, in order to charge such furnaces with residues, it is necessary to open a door. The opening of the door allows air to enter the furnace and this gives rise to exothermic reactions which are undesirable because they bring about combustion of the metal which shall be recovered.

Therefore, it has been observed that the users of such furnaces, for safety reasons, introduce a specific amount of rock-salt which also enables such exothermic reactions to be limited.

The object of the present invention is to offer an alternative to the use of rock-salt in furnaces, this alternative being less polluting and financially more economical than rock-salt.

To that end, the invention relates first of all to a method for the recovery of at least one non-ferrous metal contained in scrap, by melting the scrap in a furnace, said method comprising:
  a step of charging the furnace with scrap,
  a step of melting the scrap in order to separate the at least one non-ferrous metal from other components which the scrap comprises.

The method according to the invention is noteworthy in that it comprises a step of adding a silica-comprising product in an amount that is sufficient to form an airtight layer on the surface of the scrap. In other words, the method of the invention comprises a specific step of forming an airtight layer on the surface of the scrap (9) by adding a sufficient amount of a silica-comprising product (15).

In this method, the product (15) containing the silica is generally less dense than the non-ferrous metal (11), which permits the separation of the non-ferrous metal in the liquid state while the other components (13) and the silica of the product (15) remain in the solid state.

The presence of silica in the product makes it possible, on the one hand, to collect the said other components which the scrap comprises and, on the other hand, to have a lighter product than the non-ferrous metal which shall be recovered. The silica-comprising product (or a mixture of that product and the said other components) is thus always located on the surface of the scrap or of a mixture of scrap and non-ferrous molten metal.

In addition, since silica has a higher melting temperature than that of the non-ferrous metals which generally shall be recovered, the product (to be more precise, the silica of the product added to form the airtight layer) remains in the solid state throughout the entire recovery process. It is thus easier to separate the metal which shall be recovered, which is the only element in the molten state at the end of the process. It is also easier to recover the compound comprising a mixture of silica-comprising product and the said other components.

Because that compound is obtained in the solid state, and in particular as a powder, it is possible to clean the furnace after the non-ferrous molten metal has been recovered (or removed). Indeed, in the context of the implementation of the method in rotary furnaces, it is enough to rotate the furnace containing the compound after the recovery step in order to clean the internal walls of the furnace. The compound obtained is abrasive and enables the refractory walls to be cleaned, thus facilitating the scouring of the furnace after the metal has been drawn off.

The compound obtained is also recyclable, especially in cement works, in order to manufacture cellular or refractory concretes for buildings.

Thus, the method according to the invention allows one not only to overcome the disadvantages of the prior art by proposing a less expensive solution than that using rock-salt, but also offers a more advantageous solution than that of the prior art by permitting a simpler recovery of the non-ferrous metals and by leading to the formation of a recyclable compound.

The method according to the invention also comprises the following features, taken separately or in combination:
  the addition step is carried out before the melting step;
  the amount of silica-comprising product is substantially 10 to 20% by weight of the amount of charged scrap;
  the silica-comprising product (15) is dry;
  the method comprises a step of recovering the at least one non-ferrous metal in the liquid state and, at the end of that recovery step, a step of cleaning the furnace;
  the cleaning step consists in rotating the furnace containing a compound comprising the product and the other components, the compound being at least partially in the state of a powder;
  a quantity of flux products is added to the silica-comprising product;
  the flux products comprise cryolite and/or fluorine;
  the amount of cryolite and/or fluorine is substantially 0 to 15% by weight of the amount of silica-comprising product;
  the silica-comprising product is a sand whose density is 1.6 to 1.8.

The invention relates also to silica-based products intended for the implementation of the method as defined above. In that context, the invention relates in particular to the use of a product (15) for the implementation of a method for the recovery of at least one non-ferrous metal (11) included in scrap (9), as defined above, characterized in that the product (15) comprises silica.

The product (15) used according to the invention may also include the following features, taken separately or in combination:
  the product comprises at least one flux product;
  the flux product comprises fluorine;
  the product comprises an amount of fluorine which is substantially 0 to 15% by weight of the amount of silica, preferably 0 to 6% by weight;
  the flux product comprises cryolite;
  the product comprises an amount of cryolite which is substantially 0 to 10% by weight of the amount of silica, preferably from 0 to 5% by weight.

According to a specific embodiment, the product (15) used in the context of the invention may comprise 70 to 90% by mass silica in association with 10 to 30% by mass a mixture of additives typically comprising
  5 to 20% by mass, typically of the order of 10%, $Na_3$
  35 to 55% by mass, typically of the order of 45%, $AlF_3$
  30 to 50% by mass, typically of the order of 40%, $CaF_2$
  up to 10%, typically 1 to 8%, for example of the order of %, a dye (for example a red iron oxide).

The invention relates also to a method as defined above, comprising the following steps:
  charging a furnace (1) with scrap (9) comprising at least one non-ferrous metal (11) and other components (13),
  forming an airtight layer on the surface of the scrap (9) by adding a sufficient amount of a silica-comprising product (15),
  melting the scrap (9) in order to separate the at least one non-ferrous metal (11) from other components (13) which the scrap (9) comprises, and
  removing the at least one non-ferrous metal (11) in the liquid state,
the method being characterized in that it includes a step of recovering a mixture (17) comprising the silica-comprising product (15) and the said other components (13).

The invention relates also to the compound obtained as the mixture (17) according to the above-mentioned steps.

According to an embodiment which will be described hereinafter, the mixture (17) comprises:
  silica,
  fluorine in an amount of substantially 0 to 15% by weight of the amount of silica, preferably 0 to 6% by weight,
  and cryolite in an amount of substantially 0 to 10% by weight of the amount of silica, preferably 0 to 5% by weight.

Figure 2:
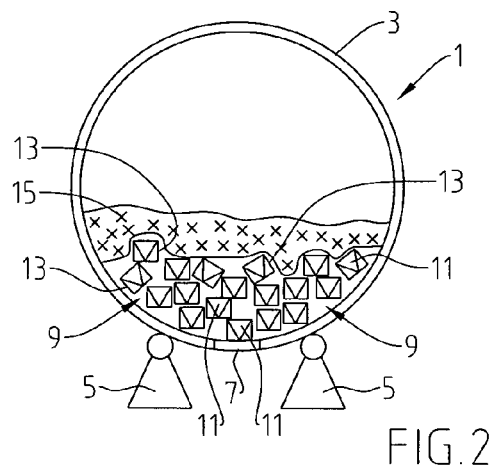
Figure 3:
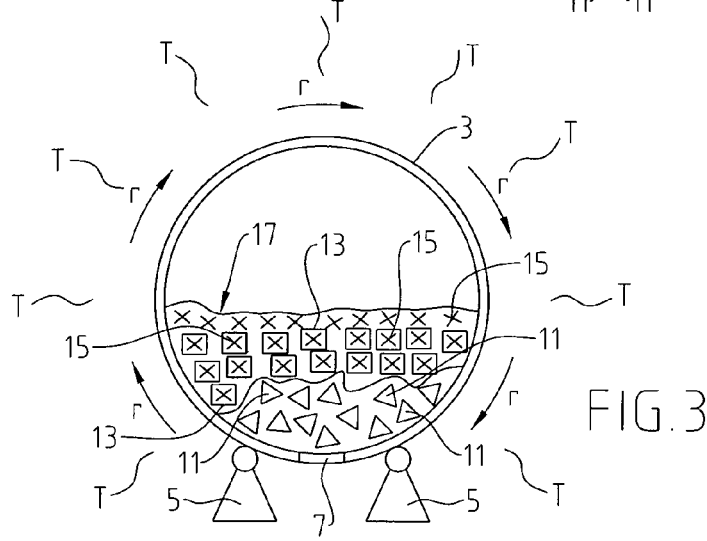
Figure 4:
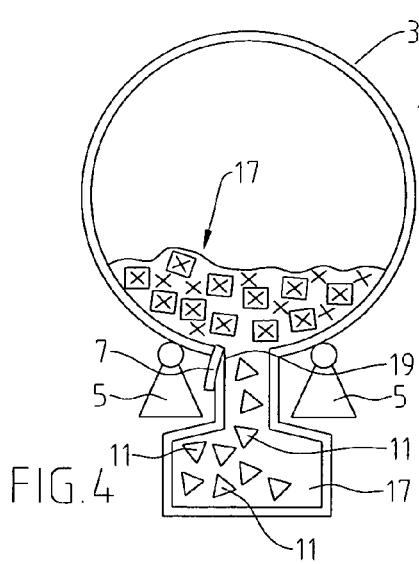
Figure 5:
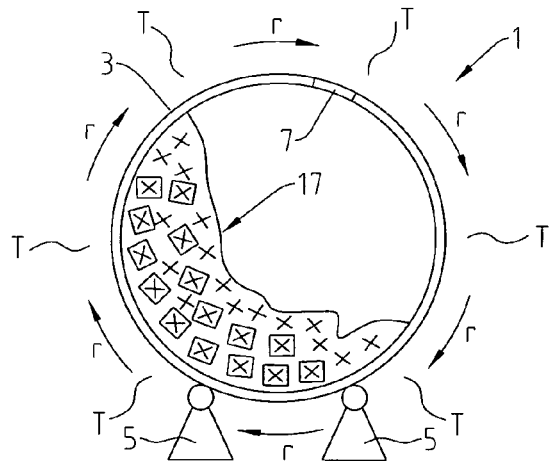

The invention will be better understood in the light of an embodiment which will now be presented with reference to the appended FIGS. 1 to 5 in which:

FIG. 1 is a schematic sectional view of a furnace into which scrap comprising at least one non-ferrous metal to be recovered has been charged, FIG. 2 is a schematic sectional view of a furnace into which the scrap shown in FIG. 1 and a product according to the invention have been charged, FIG. 3 is a schematic sectional view of a furnace which is in operation and which contains a mixture obtained from the scrap illustrated in FIGS. 1 and 2 and from the product illustrated in FIG. 2, FIG. 4 is a schematic sectional view of a furnace being shut down, showing the step of recovering the non-ferrous metal contained in the scrap after the operating step illustrated in FIG. 3, and FIG. 5 is a schematic sectional view of a furnace in operation, during a cleaning step according to the invention.

In the context of the embodiment which will now be presented, the method according to the invention is implemented in a furnace operating without the entry of air, such as described in patent application FR 2 672 620.

FIG. 1 illustrates diagrammatically such a furnace 1 comprising a substantially cylindrical vessel 3 mounted to rotate freely about its X axis.

The vessel 3 of the furnace is mounted on holding members 5 enabling it optionally to tilt in order to recover the metal in the liquid state by gravity.

In order to do that, the vessel also comprises gravity-discharge means illustrated schematically by a trap-door 7 formed in the wall of the furnace 3.

It should, however, be understood that the discharge means could be in a different form without affecting the implementation of the method according to the invention.

FIG. 1 illustrates the first step of the method according to the invention.

The furnace 1 is charged with scrap 9 comprising at least one non-ferrous metal 11 which shall be recovered, such as, for example, aluminium or its alloys, or zinc and its alloys. The non-ferrous metal 11 which is contained in the scrap 9 is illustrated schematically by a triangle.

The scrap 9 also comprises other components illustrated schematically by squares 13.

The scrap 9 may be of industrial origin or come from recovery, as defined above.

The scrap 9 charged into the furnace 1 is in the solid state.

After charging the furnace 1 with scrap, a layer of silica-comprising product 15 (represented by crosses in FIG. 2) is spread over the scrap so that the layer completely covers the surface of the charged scrap (see FIG. 2).

The amount of the charged product is considered to be sufficient when the scrap is no longer visible, the latter being completely covered by the product 15. The layer of silica-comprising product 15 then constitutes an airtight layer on the surface of the scrap.

The amount of silica-comprising product 15 charged into the furnace is substantially from 10 to 20% by weight of the amount of scrap charged into the furnace.

In the context of the present embodiment, the silica-comprising product comprises sand having a density of 1.6 to 1.8, such as that commonly used in foundries.

Such a density enables a layer which is impermeable to air to be formed on the scrap with a smaller amount of sand than that which would have to be used with a sand of higher density.

Furthermore, in the context of the present embodiment, the product 15 comprises substantially 0 to 6% by weight fluorine $CaF_2$, preferably at least 1%, more preferably at least 2%, and even more preferably at least 3% and substantially 0 to 5% by weight artificial cryolite $AlF_3$. Moreover, the product 15 may also comprise other compounds, such as $Na_3AlF_6$, typically at a level of 0 to 5% by weight.

The product 15 may also comprise 1 to 10%, for example 2 to 5%, especially 2% by weight dye, for example a red iron oxide.

Fluorine and cryolite are flux products, that is, products which promote the liquefaction of the non-ferrous metal contained in the scrap 9.

The product 15 preferably comprises both a cryolite and $CaF_2$ and, preferably, the ratio by mass of cryolite/$CaF_2$ is between 1:1 and 2:1.

Owing to the presence of those flux products, the separation reaction of the non-ferrous metal 11 from the other components 13 of the scrap 9 is accelerated.

The silica-comprising product 15 is charged into the furnace preferably in the dry state.

Indeed, in the context of this embodiment, the used furnace is a furnace which operates without the entry of air. The introduction of a moist product into the vessel 3 would give rise to the generation of steam which would be harmful to the operation of the furnace and to the desired reaction.

It should, however, be understood that, in the context of an application of the method in a traditional rotary furnace permitting the entry and discharge of air, a moist product could be used without departing from the scope of the invention.

Once the scrap 9 and the product 15 have been charged into the furnace, the vessel 3 is driven in rotation (rotation symbolized by the arrows r) in order to mix the scrap and the product 15. The internal temperature of the vessel is also increased in order to enable the non-ferrous metals 11 contained in the scrap to melt (increase in temperature indicated by the symbols T).

The silica-comprising product 15 is lighter than the non-ferrous metal 11 which shall be recovered.

Thus, the product 15 always remains on the surface in the vessel and isolates the scrap from the air, even during the step of melting the scrap in which the vessel is driven in rotation and in which the temperature of the vessel is increased in order to separate the non-ferrous metal from the other components which the scrap 9 comprises.

The non-ferrous metals 11 are liquefied and form a layer in the bottom of the vessel 3 (see FIG. 3).

The product 15 remains in the solid state on the surface in the vessel and mixes with the other components 13 of the scrap 9 to form a residual compound 17.

The residual compound 17 is, in particular, in the form of a powder.

At this stage of the method, other scrap 9 can be added to the vessel 3 without having to empty the latter.

Indeed, the residual compound 17 remains on the surface and forms a layer which is impermeable to air. Thus, no exothermic reaction occurs when the furnace 1 is opened.

When the furnace 1 is full, and after the liquefaction of all of the non-ferrous metal 11, the furnace is drained for safety reasons by means of the trap-door 7 (FIG. 4).

In order to do that, a recovery vessel 17 is connected to the vessel 3 by a conduit 19.

In order to facilitate the draining of the vessel 3, the furnace may also be tilted in order to pass from a position in which its axis is oriented in a horizontal direction to a position in which its axis is oriented in a direction inclined relative to a horizontal direction.

The liquefied non-ferrous metal at the bottom of the vessel 3 then flows into the recovery vessel 17 via the conduit 19.

The residual compound 17 still remains on the surface of the liquid metal, so that it is possible to monitor the level of the residual compound during the draining operation.

When the level of the residual compound reaches the bottom of the vessel 3, the draining step is stopped.

The trap-door 7 is then re-closed.

The vessel 3 contains substantially only the residual compound 17.

FIG. 5 illustrates schematically a step of cleaning the vessel 3 of the furnace 1 after the step of recovering the non-ferrous metal 11, illustrated in FIG. 4.

In the context of this embodiment, the cleaning step consists in re-starting the furnace 1.

The re-starting of the furnace 1 consists in driving the vessel 3 again in rotation about its axis, and in increasing the internal temperature of the vessel 3.

The residual compound 17 in the state of a powder has an abrasive effect on the internal wall of the vessel 3. The increase in internal temperature of the vessel 3, associated with the movement of the residual compound in the vessel caused by the rotational movement of the furnace 1, enables any residues burnt on to the wall to be detached and mixed with the residual compound.

Once the cleaning step has been carried out and the temperature of the vessel 3 has substantially reached ambient temperature, the vessel 3 is emptied of the residual compound 17.

The residual compound 17 may then be packaged in order to be sold as an adjuvant to concrete preparations, for example.

As may be understood from the above description, in the context of the present embodiment, the residual compound basically comprises sand, cryolite and fluorine, as well as other compounds which the initial scrap 9 comprised.

It will be understood from the above description how the method according to the invention enables the addition of rock-salt to be replaced in order to avoid exothermic reactions in furnaces.

It should, however, be understood that the invention is not limited to the above embodiment.

For example, the silica-comprising product could comprise an amount of flux product of substantially 0 to 15% by weight, for example 1 to 10% by weight, without departing from the scope of the invention.

The invention claimed is:

1. A method for recovering at least one non-ferrous metal contained in scrap, by melting the scrap in a furnace, the method comprising:
    charging the furnace with scrap,
    melting the scrap in order to separate the at least one non-ferrous metal from other components which the scrap comprises,
    forming an airtight layer on the surface of the scrap by adding a sufficient amount of a silica-comprising product,
    the non-ferrous metal being separated in the liquid state while the other components and the silica of the product remain in the solid state, and
    cleaning the furnace comprising rotating the furnace containing a compound comprising the silica-comprising product and the other components, the compound being at least partially in the state of a powder.

2. The method according to claim 1, wherein forming an airtight layer on the surface of the scrap is carried out before the melting step.

3. The method according to claim 1, wherein the amount of silica-comprising product is substantially 10 to 20% by weight of the amount of scrap charged.

4. The method according to claim 1, wherein the silica-comprising product is dry.

5. The method according to claim 1, further comprising recovering the at least one non-ferrous metal in the liquid state and, at the end of that recovery step, commencing with cleaning the furnace.

6. The method according to claim 1, wherein a quantity of flux products is added to the silica-comprising product.

7. The method according to claim 6, wherein the flux products comprise cryolite and/or fluorine.

8. The method according to claim 6, wherein the said quantity is substantially 0 to 15% by weight of the amount of silica-comprising product.

9. The method according to claim 1, wherein the silica-comprising product is a sand whose density is 1.6 to 1.8.

10. The method according to claim 1, further comprising recovering a mixture comprising the silica-comprising product and the other components.

11. The method according to claim 10, wherein the mixture comprises:
  silica,
  fluorine in an amount of substantially 0 to 15% by weight of the amount of silica, and
  cryolite in an amount of substantially 0 to 10% by weight of the amount of silica.

* * * * *